(12) United States Patent
Heitzenrater

(10) Patent No.: US 10,066,284 B2
(45) Date of Patent: Sep. 4, 2018

(54) ALUMINUM CLUTCH COMPONENTS WITH FERROUS SURFACE

(71) Applicant: GM Global Technology Operations LLC, Detroit, MI (US)

(72) Inventor: Scott William Heitzenrater, Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 489 days.

(21) Appl. No.: 14/712,569

(22) Filed: May 14, 2015

(65) Prior Publication Data

US 2015/0361539 A1    Dec. 17, 2015

Related U.S. Application Data

(60) Provisional application No. 62/012,041, filed on Jun. 13, 2014.

(51) Int. Cl.

| | |
|---|---|
| *F16D 49/08* | (2006.01) |
| *C23C 4/08* | (2016.01) |
| *F16D 65/06* | (2006.01) |
| *F16D 65/10* | (2006.01) |
| *F16D 67/04* | (2006.01) |
| *F16H 57/10* | (2006.01) |
| *F16D 65/02* | (2006.01) |
| *F16D 25/0638* | (2006.01) |

(52) U.S. Cl.
CPC ............. *C23C 4/08* (2013.01); *F16D 49/08* (2013.01); *F16D 65/065* (2013.01); *F16D 65/10* (2013.01); *F16D 67/04* (2013.01); *F16H 57/10* (2013.01); *F16D 25/0638* (2013.01); *F16D 2065/13* (2013.01); *F16D 2200/003* (2013.01); *F16D 2300/10* (2013.01); *F16D 2300/26* (2013.01)

(58) Field of Classification Search
CPC ....................................................... F16D 49/08
See application file for complete search history.

(56) References Cited

U.S. PATENT DOCUMENTS

| | | | |
|---|---|---|---|
| 6,651,786 B2 | 11/2003 | Fujii et al. | |
| 2004/0132578 A1* | 7/2004 | Richards | F16H 3/56 |
| | | | 475/283 |

FOREIGN PATENT DOCUMENTS

GB        2146554 A    4/1985

* cited by examiner

*Primary Examiner* — Derek D Knight

(57) ABSTRACT

Components for an automatic motor vehicle transmission including a band brake drum, a clutch housing or hub having a seal surface or a clutch housing or hub utilized in a friction clutch assembly having a spline set. All of these components are fabricated of aluminum and the outer surface of the band brake drum, the housing or hub sealing surface and the area of the spline set includes a thin coating of a thermally sprayed steel material. The thermally sprayed steel material may be a low carbon steel such as SAE 1008 or 1010, a similar alloy, iron or other metal. The resulting components thus exhibit the weight saving of aluminum while providing excellent service life due to the enhanced strength and wear resistance provided by the thermally sprayed steel coating.

15 Claims, 2 Drawing Sheets

ALUMINUM CLUTCH COMPONENTS WITH FERROUS SURFACE

CROSS REFERENCE TO RELATED APPLICATION

Figure 1:
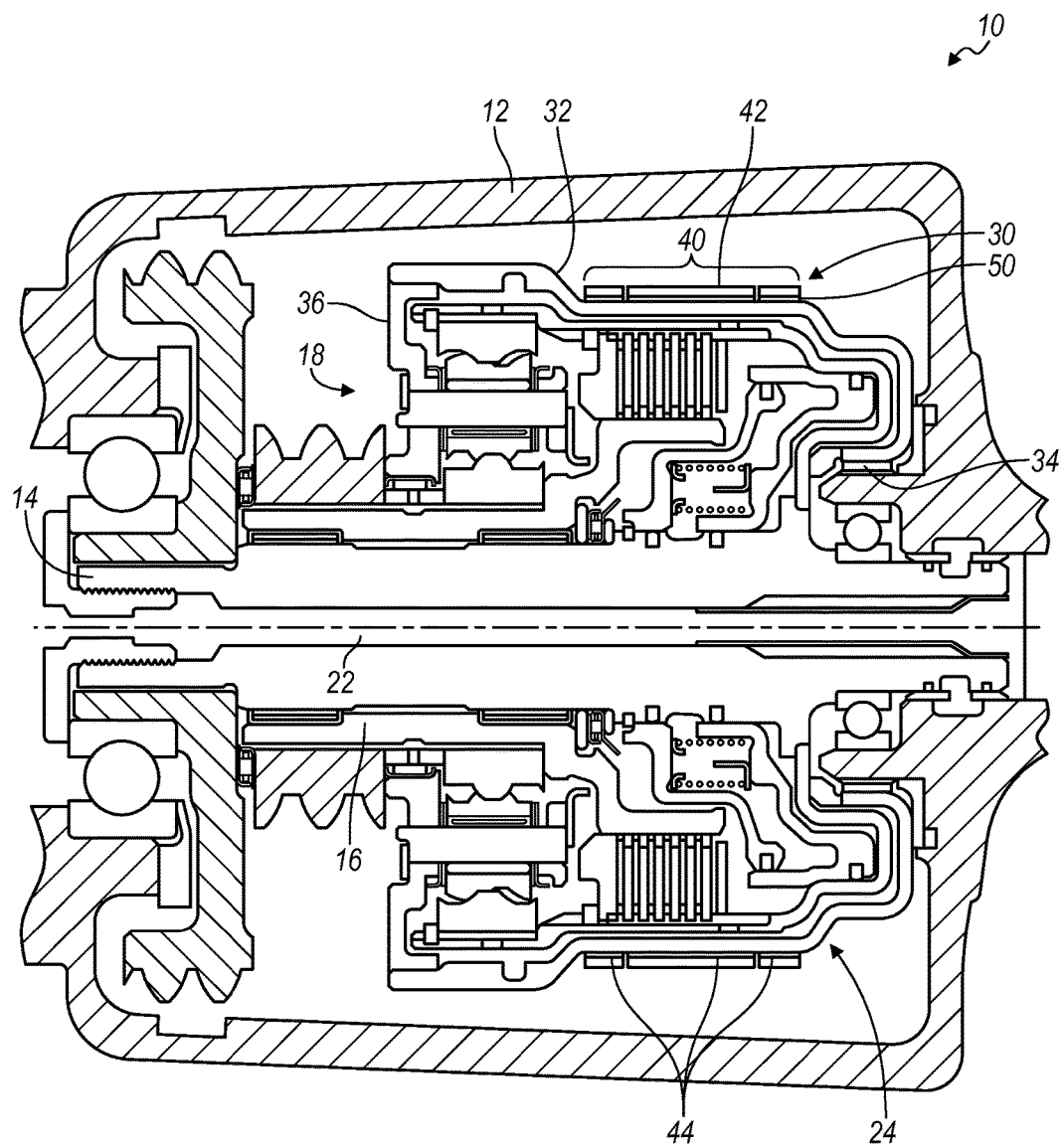

This application claims the benefit of U.S. Provisional Patent Application Ser. No. 62/012,041, filed Jun. 13, 2014, which is hereby incorporated in its entirety herein by reference.

FIELD

The present disclosure relates to aluminum components for automatic transmissions and more particularly to an aluminum band brake drum, a clutch hub seal area, a bushing area and a clutch hub spline area having a thin layer of steel, iron or similar metal disposed thereon.

BACKGROUND

The statements in this section merely provide background information related to the present disclosure and may or may not constitute prior art.

A conventional automatic transmission may include one or more band brakes, friction clutch assemblies and planetary gear assemblies. A band brake includes a band drum coupled to a rotating component such as an element of a planetary gear assembly and surrounded by a brake band that may be tightened about the drum by an actuator to brake the drum and associated component. A friction clutch includes pluralities of interleaved friction plates and reaction plates disposed between an inner hub with which the friction plates rotate and an outer housing with which the reaction plates rotate. Between the clutch hub or housing and other components such as shafts, quills or planetary gear components, it is often necessary to establish a fluid tight seal in order to either separate fluid filled, i.e., wet, areas from dry areas or to establish a flow path for fluid across or between rotating and non-rotating components. This may be achieved by, in the first case, a resilient seal disposed in a channel or groove between the areas or, in the second case, utilizing a pair of resilient seals disposed in grooves on both sides of the flow path to properly direct fluid flow. Also, one or both of the inner hub and outer housing may be coupled to a shaft or quill by splines.

Conventionally, band brake drums, friction clutch hubs and housings and components having surfaces engaged by resilient seals or including splines have been fabricated of various steels due to the strength and durability these materials provide.

While various steels provide the necessary strength and durability, they are not without drawbacks. The primary contemporary issue with such steel components is weight. Since these components are both carried and translated as part of the total vehicle weight and rotate and thus contribute to powertrain energy loss as they are repeatedly accelerated, they twice contribute to fuel consumption. Accordingly, any weight reduction of a rotating component, such as a brake drum, clutch housing or hub, positively affects fuel consumption both from the standpoint of total vehicle weight as well as powertrain efficiency.

A solution to the weight problem is the substitution of a lighter weight material such as aluminum. Aluminum has about one-third the density of steel and exhibits good heat transfer, both characteristics being important and beneficial in transmission applications. However, it has been found that a aluminum band brake drum, an aluminum clutch housing or hub or an aluminum component having splines or a sealing surface is unsuitable because aluminum does not exhibit suitable wear resistance for use as a brake drum, it may not have sufficient strength to transfer torque across a splined interconnection in a transmission and wear resistance in a bushing surface or seal application is also problematic.

Thus, while aluminum is an attractive from weight and energy savings standpoints, due to its limited strength, especially relative to common steels, in applications involving frictional service and relatively high torque levels, aluminum remains an unattractive alternative. The present invention addresses these shortcomings.

SUMMARY

The present invention provides components for an automatic transmission including a band brake drum, a clutch housing or hub having a bushing interface surface or a seal surface or a clutch housing or hub utilized in a friction clutch assembly having a spline set. All of these components are fabricated of aluminum and the outer (friction) surface of the band brake drum, the housing or hub seal or bushing surface or surfaces and the spline set and adjacent area includes a thin coating of a thermally sprayed steel material. The thermally sprayed steel material may be a low carbon steel such as SAE 1008 or 1010, a similar alloy, iron or other metal. The resulting components thus exhibit the weight saving of aluminum while providing excellent service life due to the enhanced strength and wear resistance provided by the thermally sprayed steel coating.

It is thus an aspect of the present invention to provide an automatic transmission component fabricated of aluminum and having a thin layer of thermally sprayed steel material.

It is a further aspect of the present invention to provide a brake drum for a friction drum brake assembly fabricated of aluminum and having a thin layer of thermally sprayed steel material on its outer surface.

It is a still further aspect of the present invention to provide a component for a friction clutch assembly fabricated of aluminum and having a thin layer of thermally sprayed steel material on a seal surface or surfaces.

It is a still further aspect of the present invention to provide a component for a friction clutch assembly fabricated of aluminum and having a thin layer of thermally sprayed steel material on a bushing interface surface or surfaces.

It is a still further aspect of the present invention to provide a housing or hub for a friction clutch assembly fabricated of aluminum and having a thin layer of thermally sprayed steel material on a spline set.

It is a still further aspect of the present invention to provide a brake drum for a friction drum brake assembly fabricated of aluminum and having a thin layer of thermally sprayed SAE 1008 or 1010 steel, iron or other material on its outer surface.

It is a still further aspect of the present invention to provide a component for a friction clutch assembly fabricated of aluminum and having a thin layer of thermally sprayed SAE 1008 or 1010 steel, iron or other material on a seal surface or surfaces.

It is a still further aspect of the present invention to provide a component for a friction clutch assembly fabricated of aluminum and having a thin layer of thermally sprayed SAE 1008 or 1010 steel, iron or other material on a bushing interface surface or surfaces.

It is a still further aspect of the present invention to provide a unitary housing or hub for a friction clutch assembly fabricated of aluminum and having a thin layer of thermally sprayed SAE 1008 or 1010 steel, iron or other material disposed on a spline set.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
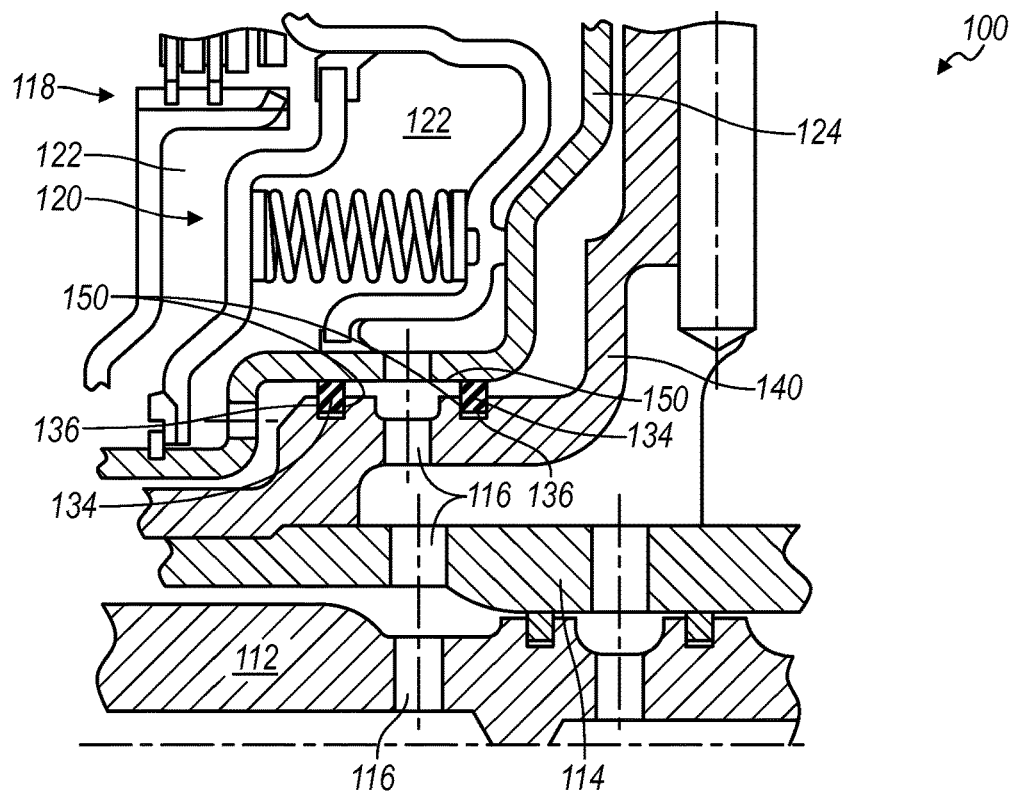
Figure 3:
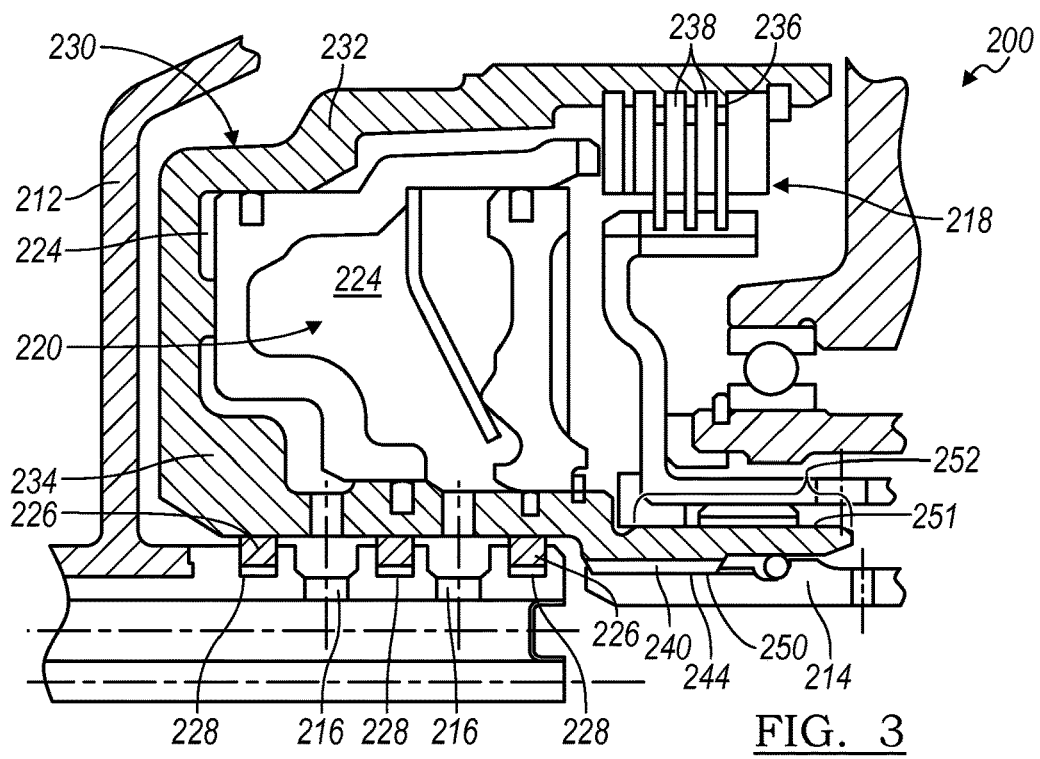

FIG. 1 is a fragmentary, full sectional view of a portion of an automatic transmission including a drum brake assembly having an aluminum brake drum or housing having a thermally sprayed coating on its friction surface;

FIG. 2 is a fragmentary sectional view of a portion of an automatic transmission including an aluminum clutch housing or support having a thermally sprayed coating on a seal surface; and FIG. 3 is a fragmentary sectional view of a portion of an automatic transmission including a unitary aluminum clutch housing or support having a thermally sprayed coating on a spline set and a bushing interface surface.

DETAILED DESCRIPTION

The following description is merely exemplary in nature and is not intended to limit the present disclosure, application, or uses.

With reference to FIG. 1, a portion of a motor vehicle automatic transmission is illustrated and generally designated by the reference number 10. The automatic transmission 10 includes a housing 12 which mounts, positions and protects various components such as an input shaft 14 a concentric quill 16, a plurality of planetary gear assemblies 18, one of which is illustrated in FIG. 1, fluid passageways 22 and a plurality of friction clutch assemblies 24, one of which is also illustrated in FIG. 1.

The automatic transmission 10 also includes a band brake assembly 30 which generally surrounds the aforementioned components and rotates on the axis of the input shaft 14 and the quill 16. The band brake assembly 30 includes a cylindrical housing 32 which is supported on an anti-friction bearing 34 such as a ball or roller bearing assembly and coupled for rotation with a component such as a planet gear carrier 36 of the planetary gear assembly 18. The cylindrical housing 32 of the band brake assembly 30 may take different forms or shapes such as axially shorter or longer or with a uniform outside diameter and the configuration illustrated should be understood to be exemplary and not limiting.

The cylindrical housing 32 includes a fully circumferentially extending outer friction surface 40 which is generally surrounded by a brake band 42. The brake band 42 includes clutch or brake friction material 44 on its inner surface facing and adjacent the outer friction surface 40 of the housing 32. An actuator (not illustrated) which may be hydraulically, electrically or pneumatically operated and which may be under the control of a transmission control module (TCM) or similar engine or vehicular controller (all not illustrated) controls the action of the actuator and tightens the brake band 42 about the friction surface 40 of the cylindrical housing 32 to cease rotation of the housing 32 and any coupled or connected component or components and relaxes the brake band 42 to allow rotation thereof.

The cylindrical housing 32 is fabricated of aluminum such as 5052 aluminum or a similar alloy and the entire outer friction surface 40 of the cylindrical housing 32 includes a thermally sprayed thin steel coating 50. Prior to thermal spray coating, the outer friction surface 40 of the bell housing 32 preferably undergoes or includes a surface treatment which provides an irregular surface finish which improves adherence of the sprayed thin steel coating 50. The thin steel coating 50 is preferably SAE 1008 or 1010 steel but may be other alloys, iron or other metals. The thin steel coating 50 on the housing 32 is then polished or undergoes similar surface treatment to obtain a desired smooth finish. The approximate finished thickness of the steel coating is 0.15 mm. (0.0059 inches) but may be thicker or thinner. The thermal spray process may be one of several similar processes, namely, high velocity oxygen fuel, powder plasma, plasma transferred wire arc or two wire arc.

The cylindrical housing 32 of the band brake assembly 30 thus provides the weight saving and low inertia advantages of aluminum as well as the durability and service life of a steel band brake drum.

Referring now to FIG. 2, another portion of a motor vehicle automatic transmission is illustrated and generally designated by the reference number 100. The automatic transmission 100 includes a center shaft 112, a quill 114 disposed concentrically about the center shaft 112, a plurality of planetary gear assemblies (not illustrated), fluid passageways 116 and a plurality of friction clutch assemblies 118, one of which is also illustrated in FIG. 2. The friction clutch assembly 118 includes a balanced hydraulic operator or actuator 120 having hydraulic fluid chambers 122 contained within an aluminum housing 124 which are selectively provided with pressurized hydraulic fluid through the fluid passageway 116 to engage and release the friction clutch assembly 118 and transmit torque therethrough.

As is often the case, the fluid passageway 116 extends across and through two or more components of the automatic transmission 100 which may and typically will rotate at different speeds, Accordingly, it is necessary to both allow for such rotation between components and seal and restrict fluid flow to the desired path. As illustrated in FIG. 2, a pair of resilient seals 134 are seated in a corresponding pair of grooves 136 in an aluminum support 140 on opposite sides of the fluid passageway 116 to tightly seal the fluid passageway and direct fluid radially through the passageway 116 to the chambers 122 of the hydraulic operator 120.

As noted above, both the housing 124 and the support 140 are fabricated of aluminum or an aluminum alloy and the outer surface of the housing 124 adjacent the fluid passageway 116 and facing the resilient seals 134 and the interior surfaces of the pair of grooves 136 includes a thermally sprayed thin steel coating 150. Prior to the thermal spray coating 150 being applied, the aluminum preferably undergoes a surface treatment to provide an irregular surface finish which improves adherence of the sprayed thin steel coating 150. The thin steel coating 150 is preferably SAE 1008 or 1010 steel but may be other alloys, iron or other metals. The thin steel coating 150 on the outer surface of the housing 124 is then machined or undergoes similar surface treatment to obtain a desired final diameter of the housing 124 and finish of the thin steel coating 150. The approximate finished thickness of the steel coating 150 is 0.15 mm. (0.0059 inches) but may be thicker or thinner. The thermal spray process may be one of several similar processes, namely, high velocity oxygen fuel, powder plasma, plasma transferred wire arc or two wire arc.

Referring now to FIG. 3, another portion of a motor vehicle automatic transmission is illustrated and generally designated by the reference number 200. The automatic transmission 200 includes a housing 212, a rotating shaft or quill 214, a plurality of planetary gear assemblies (not illustrated), a plurality of fluid passageways 216 and a plurality of friction clutch assemblies 218, one of which is illustrated in FIG. 3. The friction clutch assembly 218 includes a balanced hydraulic operator or actuator 220 having hydraulic fluid chambers 224 contained within a unitary aluminum housing and hub assembly 230. The hydraulic fluid chambers 224 are selectively provided with pressurized hydraulic fluid through the fluid passageways 216 to engage and release the friction clutch assembly 218 and transmit torque therethrough. Three resilient seals 226 in corresponding grooves 228 adjacent the fluid passageways 216 tightly seal and isolate the fluid passageways 216 and direct hydraulic fluid to the chambers 224 of the hydraulic operator or actuator 220

The unitary aluminum housing and hub assembly 230 preferably combines into one component an "L" shaped housing portion 232 which extends radially and axially on the outside of the friction clutch assembly 218 and an irregular, generally cylindrical hub portion 234 which extends axially on the inside of the friction clutch assembly 218. The housing portion 232 of the housing and hub assembly 230 includes a plurality of female splines 236 which engage and couple a plurality of reaction plates 238 in the friction clutch assembly 218 to the housing and hub assembly 230 as well as other components thereof. The hub portion 234 of the housing and hub assembly 230 also includes a plurality of female splines 240 which mate with a plurality of complementary male splines 244 on the shaft or quill 214 to transmit torque therebetween. The cylindrical hub portion 234 of the housing and hub assembly 230 also includes a bushing interface surface 251.

The plurality of female splines 240 includes a thermally sprayed thin steel coating 250. Prior to the thermal spray coating 250 being applied, the plurality of aluminum female splines 240 preferably undergoes a surface treatment to provide an irregular surface finish which improves adherence of the sprayed thin steel coating 250. The thin steel coating 250 is preferably SAE 1008 or 1010 steel but may be other alloys, iron or other metals. The thin steel coating 250 on the plurality of female splines 240 is then machined or undergoes similar surface treatment to obtain a desired size and geometry of the female splines 240 and the finish of the thin steel coating 250 if needed. The approximate finished thickness of the steel coating 250 is 0.15 mm. (0.0059 inches) but may be thicker or thinner. The thermal spray process may be one of several similar processes, namely, high velocity oxygen fuel, powder plasma, plasma transferred wire arc or two wire arc.

The bushing interface surface 251 also includes a thermally sprayed thin steel coating 252. Prior to the thermal spray coating 252 being applied, the bushing interface surface 251 preferably undergoes a surface treatment to provide an irregular surface finish which improves adherence of the sprayed thin steel coating 252. The thin steel coating 252 is preferably SAE 1008 or 1010 steel but may be other alloys, iron or other metals. The thin steel coating 252 on the bushing interface surface 251 is then machined or undergoes similar surface treatment to obtain a desired size and geometry of the bushing interface surface 251 and the finish of the thin steel coating 252 if needed. The approximate finished thickness of the steel coating 252 is 0.15 mm. (0.0059 inches) but may be thicker or thinner. Once again, the thermal spray process may be one of several similar processes, namely, high velocity oxygen fuel, powder plasma, plasma transferred wire arc or two wire arc.

The unitary aluminum housing and hub assembly 230 of the present invention combines into a single aluminum component what was heretofore two components including a steel hub which was riveted to or serrated and press fit onto the housing. Additionally, the unitary aluminum housing and hub assembly 230 provides weight savings in a component that may be retrofit into the same applications and occupies the same or less packaging space.

The description of the invention is merely exemplary in nature and variations that do not depart from the gist of the invention are intended to be within the scope of the invention. Such variations are not to be regarded as a departure from the spirit and scope of the invention.

What is claimed is:

1. A drum brake assembly for an automatic motor vehicle transmission comprising, in combination,
   a generally cylindrical aluminum brake drum disposed for rotation about a center axis, said brake drum having a first end, a second end and an outer surface including an annular region disposed about said center axis having a non-aluminum metal coating, said non-aluminum metal coating is one of SAE 1008 steel, SAE 1010 steel and iron,
   a planet gear carrier supporting and coupled to said first end of said brake drum,
   an anti-friction bearing supporting said second end of said brake drum, and
   a brake band disposed about said brake drum and having an inner surface, a layer of friction material disposed on said inner surface and engaging said non-aluminum metal coating on said annular region.

2. The drum brake assembly of claim 1 wherein said non-aluminum metal coating is further one of iron alloys and other metals.

3. The drum brake assembly of claim 1 wherein said metal coating is applied to said annular region by a thermal spray process.

4. The drum brake assembly of claim 1 further including a planetary gear assembly.

5. The drum brake assembly of claim 1 wherein said generally cylindrical aluminum brake drum has at least two distinct diameters.

6. The drum brake assembly of claim 1 wherein said brake band is wrapped about said brake drum.

7. The drum brake assembly of claim 1 further including a stationary housing supporting a shaft, said shaft defining said center axis.

8. The brake drum assembly of claim 1 wherein said generally cylindrical aluminum brake drum is fabricated of 5052 aluminum or a similar alloy.

9. A drum brake assembly for an automatic motor vehicle transmission comprising, in combination,
   a cylindrical aluminum brake drum disposed for rotation about a center axis, said brake drum having a first end, a second end and an outer surface including an annular region disposed about said center axis having a coating of one of SAE 1008 steel, SAE 1010 steel and similar steel alloys,
   a planet gear carrier of a planetary gear assembly coupled to said first end of said brake drum,
   a bearing supporting said second end of said brake drum, and a brake band disposed about said brake drum and having an inner surface, a layer of friction material disposed on said inner surface and engaging said coating on said annular region.

10. The drum brake assembly of claim 9 wherein said coating is applied to said annular region of said brake drum by a thermal spray process.

11. The drum brake assembly of claim 9 wherein said planetary gear assembly further includes a sun gear and planet gears.

12. The drum brake assembly of claim 9 wherein said cylindrical aluminum brake drum has at least two distinct diameters.

13. The drum brake assembly of claim 9 wherein said brake band is wrapped partially about said brake drum.

14. The drum brake assembly of claim 9 wherein said cylindrical aluminum brake drum has a larger diameter region and a smaller diameter region and said brake band is disposed about said smaller diameter region.

15. The brake drum assembly of claim 9 wherein said cylindrical aluminum brake drum is fabricated of 5052 aluminum or a similar alloy.

\* \* \* \* \*